(12) United States Patent
Schenk et al.

(10) Patent No.: US 11,906,935 B2
(45) Date of Patent: Feb. 20, 2024

(54) WATCH CASE BACK WITH AN ELECTRONIC DEVICE FOR WIRELESS CHARGING OF A POWER SOURCE

(71) Applicant: ETA SA Manufacture Horlogere Suisse, Grenchen (CH)

(72) Inventors: Marc Schenk, Le Landeron (CH); Laurent Mouche, Les Genevez (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 843 days.

(21) Appl. No.: 16/983,200

(22) Filed: Aug. 3, 2020

(65) Prior Publication Data
US 2021/0096514 A1  Apr. 1, 2021

(30) Foreign Application Priority Data
Sep. 30, 2019  (EP) .................................... 19200486

(51) Int. Cl.
*G04G 19/00* (2006.01)
*H02J 50/10* (2016.01)
(Continued)

(52) U.S. Cl.
CPC .............. *G04G 19/00* (2013.01); *G04B 25/04* (2013.01); *G04C 10/00* (2013.01); *H02J 50/10* (2016.02)

(58) Field of Classification Search
CPC ......... G04G 19/00; H02J 50/10; G04B 25/04; G04C 10/00
See application file for complete search history.

(56) References Cited

U.S. PATENT DOCUMENTS 3,800,523 A * 4/1974 Yamazaki ................ G04F 5/00
                                                       968/878
3,948,036 A * 4/1976 Morokawa ............. G04G 3/022
                                                       968/910
(Continued)

FOREIGN PATENT DOCUMENTS

CN           107005096 A        8/2017
CN           207396979 U        5/2018
(Continued)

OTHER PUBLICATIONS

European Search Report dated Mar. 20, 2020 in European Application 19200486.9 filed Sep. 30, 2019 (with English Translation of Categories of Cited Documents), 3 pages.
(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A removable case back of an electronic or electromechanical watch case, the case back allows the wireless charging or recharging of a power source. The case back includes a first multi-function sub-assembly having a buzzer, an inductive coil on or integrated in a printed circuit board, the inductive coil being covered by a magnetic shield on an inner side of the watch case, and a second multi-function sub-assembly on the first multi-function sub-assembly having an enclosure structure for accommodating the power source, such as a battery or an accumulator.

16 Claims, 4 Drawing Sheets

(51) Int. Cl.
*G04B 25/04* (2006.01)
*G04C 10/00* (2006.01)

(56) References Cited

U.S. PATENT DOCUMENTS

| | | | | | |
|---|---|---|---|---|---|
| 4,126,992 | A | * | 11/1978 | Yasuda | G04B 19/253 368/321 |
| 4,129,817 | A | * | 12/1978 | Yew | H01H 19/28 320/120 |
| 4,459,037 | A | * | 7/1984 | Toyoda | G04C 21/34 368/255 |
| 4,772,765 | A | * | 9/1988 | Markle | H01H 9/063 200/332.2 |
| 4,988,308 | A | * | 1/1991 | Toedtman | H01R 13/6315 248/27.3 |
| 5,083,926 | A | * | 1/1992 | Kissinger | H01R 12/7064 411/509 |
| 5,380,971 | A | * | 1/1995 | Bittel | H01H 9/06 200/522 |
| 6,821,162 | B2 | * | 11/2004 | Mott | B29C 45/14549 439/722 |
| 8,908,479 | B2 | * | 12/2014 | Teng | G04C 10/00 368/204 |
| 9,331,731 | B2 | * | 5/2016 | Wang | H04B 1/385 |
| 9,575,466 | B1 | * | 2/2017 | Thompson | G04B 47/06 |
| 10,250,064 | B2 | | 4/2019 | Park et al. | |
| 2002/0171400 | A1 | * | 11/2002 | Koyama | G04G 21/04 320/135 |
| 2013/0257367 | A1 | * | 10/2013 | Someya | H01F 27/28 320/108 |
| 2014/0177399 | A1 | | 6/2014 | Teng et al. | |
| 2015/0220066 | A1 | * | 8/2015 | Fujisawa | G04R 60/06 368/278 |
| 2015/0311960 | A1 | * | 10/2015 | Samardzija | H01Q 1/273 455/90.3 |
| 2016/0291550 | A1 | * | 10/2016 | Chen | H01M 10/425 |
| 2017/0170677 | A1 | | 6/2017 | Park et al. | |
| 2019/0388028 | A1 | | 12/2019 | Kim et al. | |
| 2020/0323489 | A1 | * | 10/2020 | Kim | A61B 5/1455 |

FOREIGN PATENT DOCUMENTS

| | | |
|---|---|---|
| CN | 109729689 A | 5/2019 |
| WO | WO 2018/105773 A1 | 6/2018 |

OTHER PUBLICATIONS

Combined Chinese Office Action and Search Report dated Aug. 4, 2021 in Chinese Patent Application No. 202011063831.5, 5 pages.

* cited by examiner

WATCH CASE BACK WITH AN ELECTRONIC DEVICE FOR WIRELESS CHARGING OF A POWER SOURCE

CROSS-REFERENCE TO RELATED APPLICATION

This application claims priority to European Patent Application No. 19200486.9 filed on Sep. 30, 2019, the entire disclosure of which is hereby incorporated herein by reference.

FIELD OF THE INVENTION

The invention concerns a removable watch case back having an electronic device provided with functions to allow the wireless charging or recharging of a power source of the electronic or electromechanical connected watch.

The invention also concerns an electronic or electromechanical watch comprising the removable case back with the electronic device for wireless charging of a power source in the watch.

The invention also concerns a method for assembling the removable case back with the electronic device for wireless charging of a power source.

BACKGROUND OF THE INVENTION

The life of a cell or battery in a connected watch, such as a smart watch, remains today a major weak point of such a product. This requires a rate of charging or recharging of the watch battery, which depends on the modes of use of the watch wearer. Usually for a battery charging operation, an external cable connector connected to a voltage source can be connected to a corresponding connector on the watch case. Recharging can be obtained by a solar cell of the watch or by using electrical induction from a charging device.

Electrical induction recharging technology provides many advantages for the product, such as the watch. On the one hand, from an aesthetic point of view, since no physical and waterproof connection needs to be integrated in the external part of the watch to connect the charging cable. On the other hand, the charging time by electrical induction is constant, compared to solar charging, which is very dependent on ambient light.

Wireless charging can be based on the principle of electrical induction, whereby the flow of an electric current through a coil creates a current in a nearby coil. For a watch, one of the coils (the receiver coil) is mounted in the watch case back, whereas another coil (the charger coil), nearby and powered by an electric current, will produce a magnetic field, which creates an electric current induced in the (receiver) coil, to power the battery.

It is to be noted that the proximity of metallic elements, such as certain external components of the watch, can reduce efficiency during recharging of the battery. Further, the electromagnetic field between the two coils will induce a current in nearby metal parts. This induced current risks causing these metal parts to heat up. In such case, it is envisaged to provide a shield for the watch coil to avoid field leaks. This shield may be a ferrite.

U.S. Pat. No. 10,250,064 B2 discloses an electronic device comprising a case with a conductive coil arranged inside the case, a movable element operationally connected to at least one part of the case and comprising one or more magnets which generate a magnetic field that passes through the conductive coil, a first charging circuit electrically connected to the conductive coil for wirelessly receiving power from an external device using the conductive coil and supplying the power received to a battery of the electronic device, and a second charging circuit electrically connected to the conductive coil to supply, to the battery of the electronic device, the power that is induced in the conductive coil based on the movement of the movable element. The device can comprise a conductive element arranged in the case cover, such as a coil for wireless charging to support wireless recharging.

WO Patent No. 2018/105773 A1 discloses a mobile terminal comprising a wireless charging coil located in an inner space, wherein the shielding sheet has empty spaces at positions where the wireless charging coil and the components mounted on the main board overlap with each other. The battery unit is arranged at the front of the main board. The wireless recharging coil is located at the back of the main board to which it is bonded, and the rear case covers the wireless recharging coil and the main board.

In the aforementioned prior art, the charging coil is not arranged in a convenient manner inside the watch case cooperating with the battery to be charged. Space is wasted and the connection between the two parts does not guarantee proper recharging without loss of current.

SUMMARY OF THE INVENTION

It is therefore a main object of the invention to overcome the drawbacks of the prior art by proposing a removable watch case back having an electronic device provided with functions to allow the wireless charging or recharging of a power source, such as a battery or cell.

To this end, the invention concerns a removable watch case back having an electronic device provided with functions to allow the wireless charging or recharging of a power source, which includes the features of the independent claim 1.

Particular embodiments of the removable case back are defined in the dependent claims 2 to 11.

One advantage of the removable case back lies in the fact that it is possible to provide an integrated power source, such as a large capacity rechargeable battery or accumulator in a reduced space in the watch. The arrangement of the power source in the enclosure structure ensures resistance to mechanical shocks. Further, the battery enclosure structure is injection moulded, pre-assembled and separate from the rest of the movement. The removable case back is of small thickness and has a base support made of ceramic or plastic.

Advantageously, an inductive coil is made on or integrated in a printed circuit board of the first multi-function sub-assembly. The printed circuit board can comprise components, such as sensors, or connectors. One of the connectors is arranged on a flexible tongue of the printed circuit board for connection to a main printed circuit board of the watch module of the watch.

Advantageously, the removable case back fixed to a middle part of the closed watch case is waterproof to a pressure of at least 10 bars. The case back is designed to be easily compatible with an induction charging device.

To this end, the present invention also concerns an electronic or electromechanical watch suitable for an operation of wireless charging or recharging of an internal power source, which includes the features of the independent claim 12.

At least one particular embodiment of the watch is defined in the dependent claim 13.

To this end, the invention also concerns an assembly comprising an electronic or electromechanical watch and a device for charging or recharging the power source of the watch.

To this end, the present invention also concerns a method for assembling a removable case back, which includes the features of the independent claim 15.

At least one particular step of the method is defined in the dependent claim 16.

BRIEF DESCRIPTION OF THE DRAWINGS

The objects, advantages and features of a removable watch case back having an electronic device provided with functions to allow the wireless charging or recharging of a power source in the watch, will appear more clearly in the following non-limiting description with reference to the drawings in which.

DETAILED DESCRIPTION OF THE INVENTION

In the following description, all those components of a watch, such as an electronic or electromechanical watch, which are well known to those skilled in the art in this technical field, are only described in a simplified manner. The watch with an electronic device for the wireless charging of a power source is of the smart watch type, such as a wristwatch, capable of comprising components for wireless connection to a communication device or to a charging device. A solar cell can also be provided as the additional power source for the electronic or electromechanical watch.

According to the present invention, the removable back cover of an electronic or electromechanical watch case, is provided with functions to allow, in particular, the wireless charging or recharging of an electrical power source of the watch components. The removable case back comprises at least two multi-function sub-assemblies which are mounted, for example, one above the other.

Figure 1A:
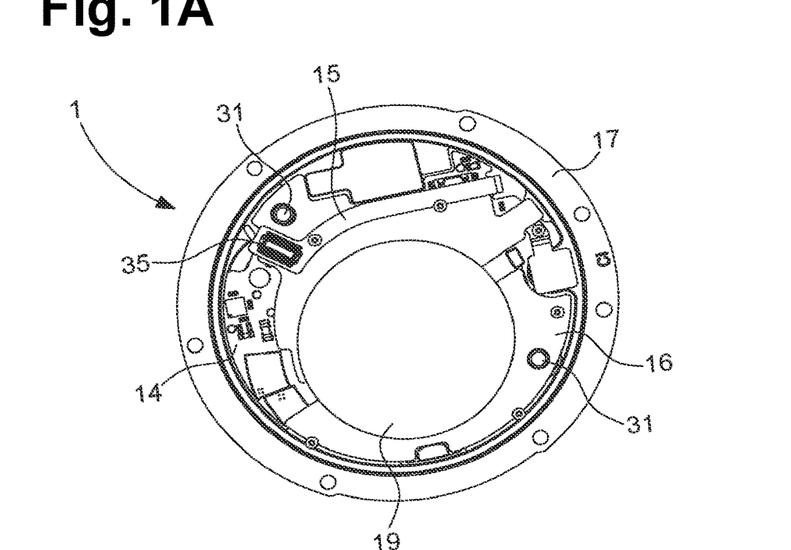
FIGS. 1A and 1B respectively represent a top view and a three-dimensional exploded view of an embodiment of a first multi-function sub-assembly of a watch case back with an electronic wireless charging device of the watch according to the invention.
Figure 1B:
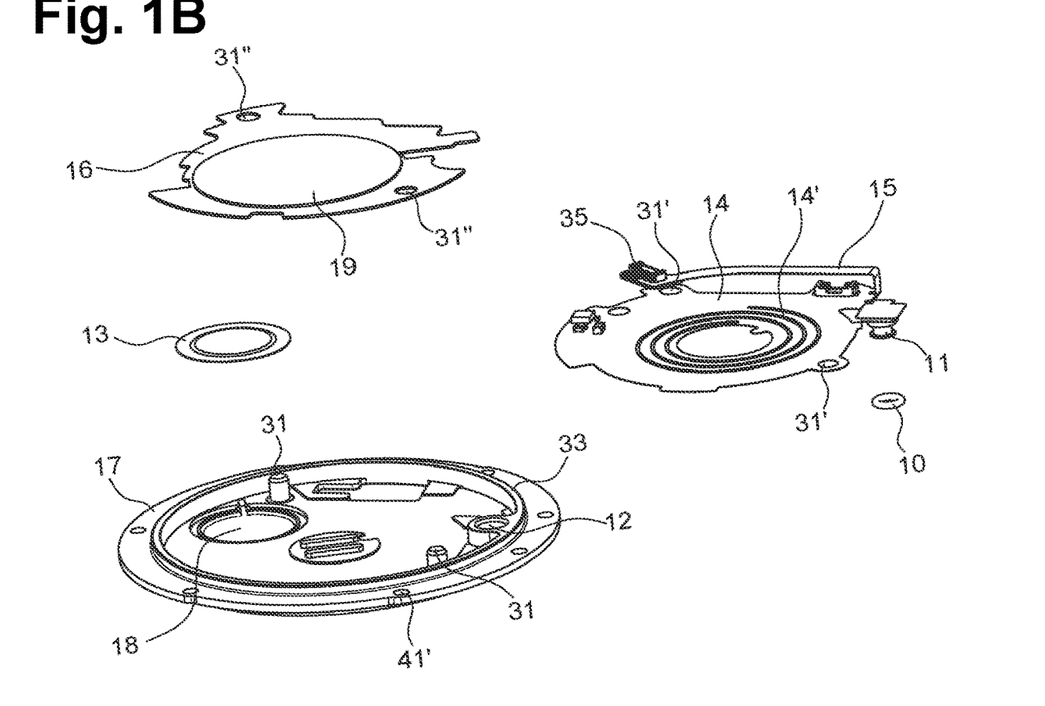

FIGS. 1A and 1B respectively represent top and three-dimensional exploded views of a first multi-function assembly 1 of the removable case back. This first multi-function sub-assembly 1 essentially comprises a buzzer 13, such as a piezoelectric buzzer, an inductive coil 14' on or integrated in a printed circuit board 14. This inductive coil 14' in the form of a spiral can be made on a lower surface or an upper surface of printed circuit board 14. Inductive coil 14' is covered by a magnetic shield 16 on the side of the inside of the watch case or of the watch.

First multi-function sub-assembly 1 can comprise as a base, a base support 17, which can be screwed, by means of screws passing through holes 41' at the periphery of base support 17, to a middle part of the watch case, as explained below with reference to FIG. 4. Case back support 17 is of generally reduced thickness and can be produced by injection moulding or machining different materials, such as fibre-reinforced polymers, or ceramic or ferromagnetic materials. Colours can be integrated in these materials.

A housing 18 is provided in base support 17 to accommodate piezoelectric buzzer 13. Piezoelectric buzzer 13 is positioned and adhesive bonded or held in housing 18. A connector can also be provided in the housing for electrically connecting piezoelectric buzzer 13. As piezoelectric buzzer 13 is directly connected and adhesive bonded in housing 18 of base support 17, which is intended to come into direct contact with the watch wearer's wrist, this enhances the sensation of the vibration generated by buzzer 13 felt by the watch wearer. Normally, contact springs of buzzer 13 can also be provided when buzzer 13 is positioned and adhesive bonded in its housing 18. The contact springs, not represented, pass next to ferrite magnetic shield 16.

Base support 17 also includes two posts or dowel pins 31, which are machined from the bottom of base support 17 and oriented perpendicularly towards the top of the inner side of the watch case. These posts 31 are cylindrical in shape and have chamfered ends. Printed circuit board 14 and magnetic screen 16 are placed one above the other on posts 31 respectively through two holes 31' and two other holes 31". Printed circuit board 14 comprising inductive coil 14' can be adhesive bonded onto an inner part of base support 17, which contains buzzer 13. Magnetic ferrite shield 16 can also be adhesive bonded onto printed circuit board 14.

Once the second multi-function sub-assembly is mounted on first multi-function sub-assembly 1, posts 31 have the additional function of ensuring the contacts with the Terminals of the voltage source, of the buzzer and of any vibrator. A border 33 can also be provided between the screw attachment flange and the interior of base support 17, which defines an inner cavity or inner portion. This border 33 can also be used to retain the second multi-function sub-assembly once mounted on first multi-function sub-assembly 1.

A pressure sensor 11 in the form of a cylindrical stud comprises an annular peripheral groove for receiving an annular sealing gasket of the O-ring type 10 to be housed in a cylindrical receptacle 12 of complementary shape to base support 17. At least one hole, or even two holes (not represented) are made in the bottom of the receptacle to provide access to the exterior of the watch case for the pressure measurement by pressure sensor 11. Pressure sensor 11 is mounted on printed circuit board 14. Further, magnetic shield 16 is also arranged to be partly covered by an insulating foam layer 19, which is adhesive bonded to magnetic shield 16. This insulating foam 19 represented, for example, as circular, makes it possible to compress the power source, such as a battery and ensure its resistance to shocks once the back cover is mounted to a middle part of the watch case.

It is also to be noted that printed circuit board 14 can be at least partly flexible. It comprises a portion in the form of a flexible tab 15 to move over the second multi-function sub-assembly explained below. This tab 15 ends in a connector 35 with several pins for connection to a complementary connector of a main printed circuit board of the watch module. Via this connector 35, the components of the watch module can be electrically powered. Moreover, any command or control can be supplied by a control unit, such as a microcontroller, from the watch module to the electronic components of the two multi-function sub-assemblies. Printed circuit board 14 can carry or electrically connect several components, such as a pressure sensor, a compass, various hardware components, a buzzer connector, the main connector 35 to the watch movement, and a rectifier circuit connected to the coil to rectify the induced voltage. The electronic components are connected to conductive paths of printed circuit board 14.

Figure 2A:
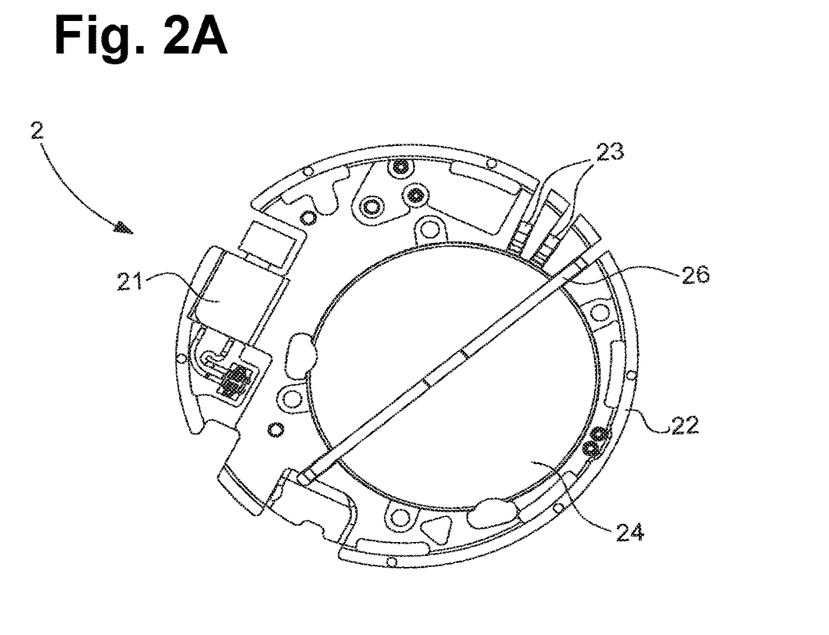
FIGS. 2A and 2B respectively represent a bottom view and a three-dimensional exploded view of an embodiment of a second multi-function sub-assembly of a watch case back with an electronic wireless charging device of the watch according to the invention.
Figure 2B:
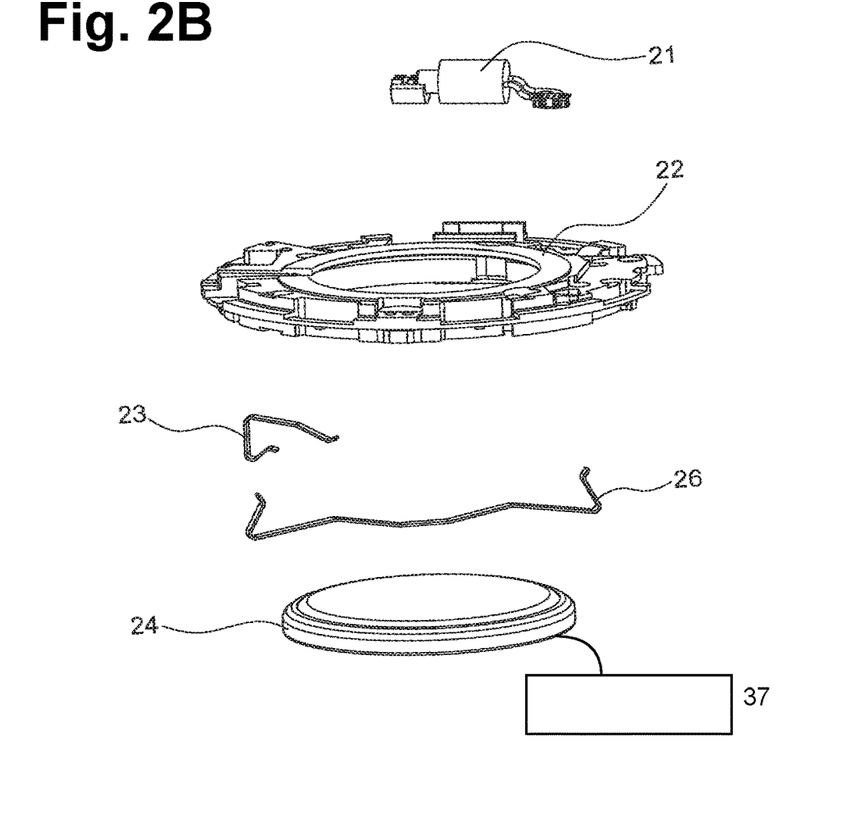

FIGS. 2A and 2B respectively represent bottom and three-dimensional exploded views of a second multi-function sub-assembly 2 of the removable case back. This second multi-function sub-assembly 2 is intended to be mounted, connected and positioned on the first multi-function sub-assembly.

This second multi-function sub-assembly 2 comprises an enclosure structure 22 for accommodating a power source, such as a battery or an accumulator 24. Preferably, in the following description, a battery 24 will mainly be described as the power source, but in a non-limiting manner with respect to other power sources. This enclosure structure 22 is a specific plastic injection moulded component. A through opening is provided in enclosure structure 22 of complementary shape to the battery to accommodate the latter. A device 37 can be provided for charging or recharging the power source.

After assembly, the second multi-function sub-assembly 2 contains battery 24, at least contact strips 23, 26 and a vibrator 21. A flange connector is provided at the output of vibrator 21 for connection to a complementary flange connector of the printed circuit board of the first multi-function sub-assembly. One or two first contact strips 23 are used to connect the negative terminal of battery 24, while at least a second contact strip 26 is provided to connect the positive terminal of battery 24.

During assembly of the watch case, the assembled enclosure structure 22 of battery 24 is centred and aligned using two posts of the base support of the first multi-function sub-assembly as explained below with reference to FIGS. 3 and 4. This thus ensures the contacts of strips 23, 26, of the buzzer and of vibrator 21 which is connected via a connector. The printed circuit board with the inductive coil comprises a flexible tab passing above enclosure structure 22 and equipped with the connector with several pins for connection to the watch module. The degree of freedom in height Z of assembled enclosure structure 22 of battery 24 is locked by its peripheral collar, which is clamped between the middle part and removable back of the watch case.

It is to be noted that contact strips 23, 26 come into contact with conductive pads connected to conductive paths on the printed circuit board for the electrical supply of the various components.

Figure 3:
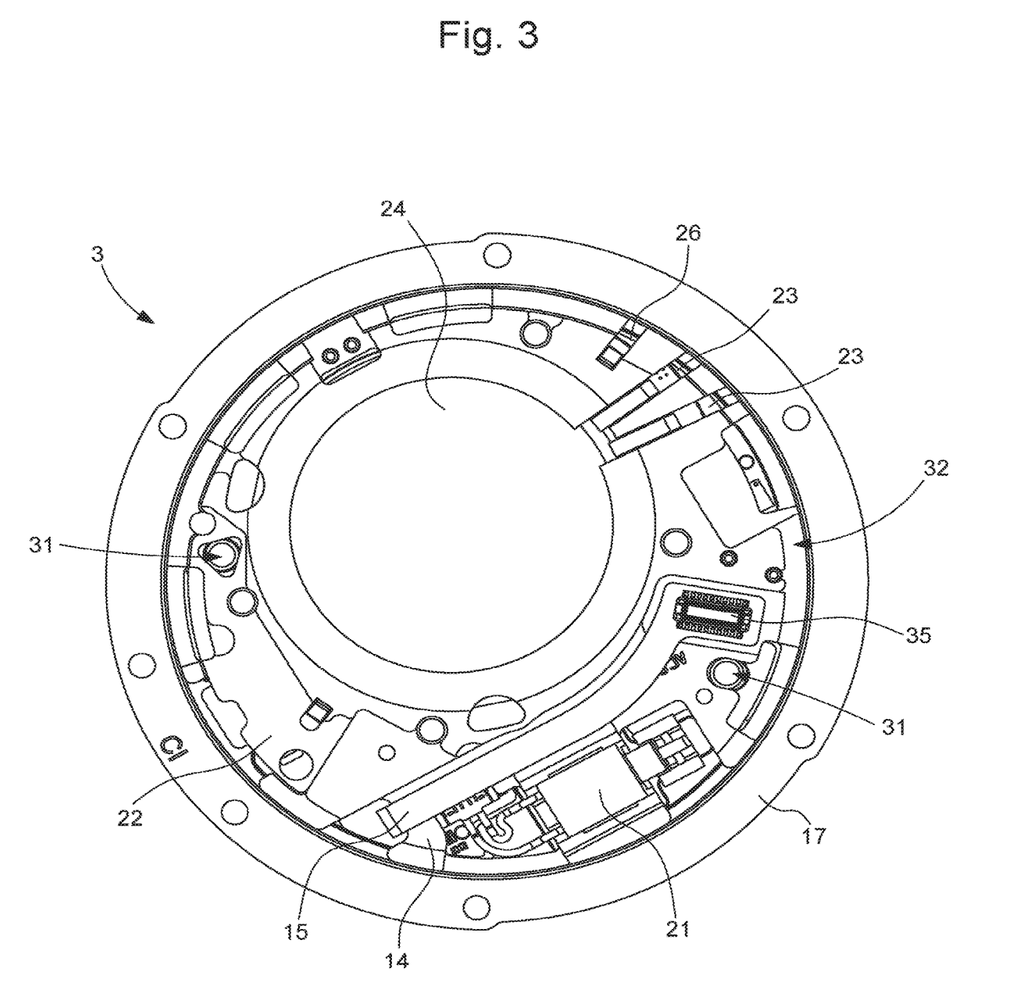
FIG. 3 represents a top view of the final assembly of the two multi-function sub-assemblies according to the invention, respectively represented in FIGS. 1A-1B and 2A-2B.

FIG. 3 represents a top view of the final assembly of the two multi-function sub-assemblies to form removable case back 3. FIG. 3 shows the same elements with identical references to those described above with reference to FIGS. 1 and 2. The description of these elements is not, therefore, repeated.

Figure 4:
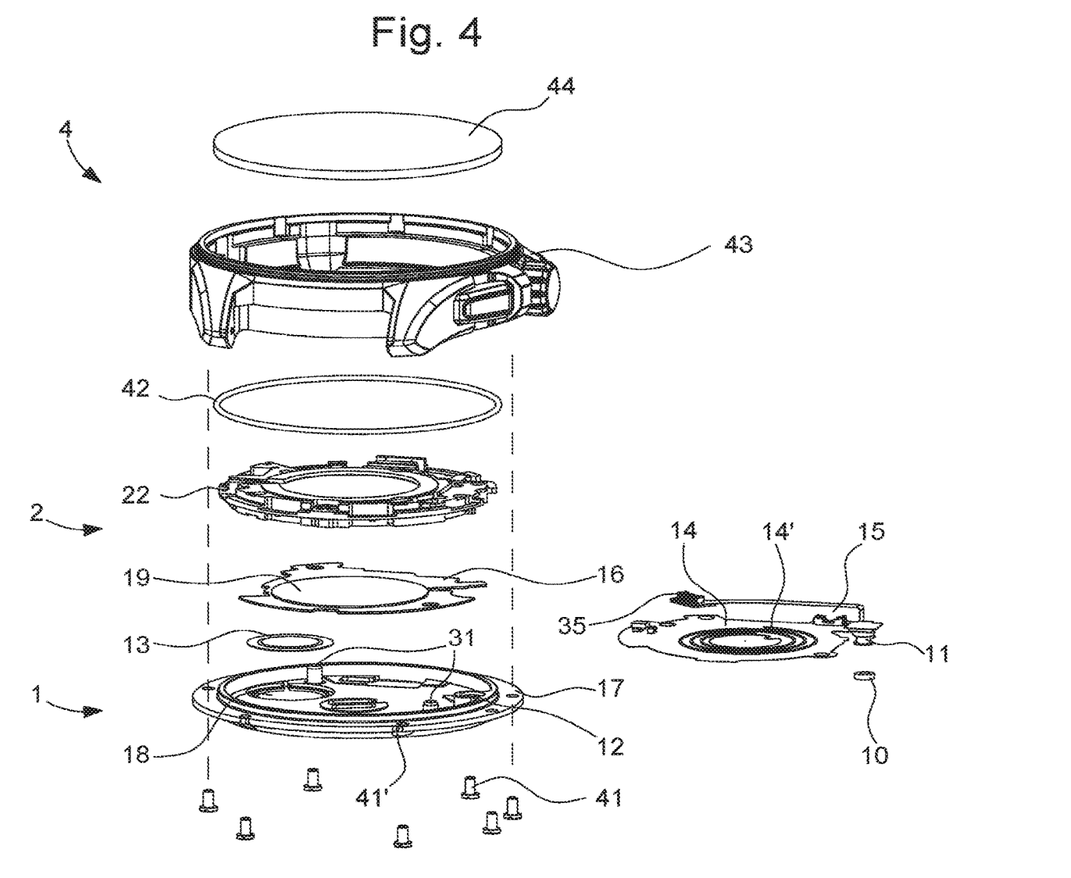
FIG. 4 represents a three-dimensional exploded view of the watch case according to the invention.

FIG. 4 represents a three-dimensional exploded view of electronic or electromechanical watch case 4 according to the invention. The removable case back comprises first multi-function sub-assembly 1 and second multi-function sub-assembly 2, of which only enclosure structure 22 is shown for the sake of simplicity. The removable case back is mounted to a lower portion of a middle part 43 of watch case 4 by means of a sealing gasket 42, which takes the form of an O-ring type annular joint. For this purpose, the removable case back is fixed to the lower portion of case middle 43 by screws 41 passing through openings 41' of a peripheral rim of base support 17. Watch case 4 is closed on an upper portion of case middle 43 by at least one crystal 44 or a crystal surrounded by a bezel. A watch module (not represented) is disposed inside watch case 4 above the removable case back and generally underneath a display screen or a watch dial underneath crystal 44.

The method for assembling the removable case back of an electronic or electromechanical watch case is explained below with reference to FIG. 4. The assembly method includes steps of mounting the first multi-function sub-assembly 1. The steps are as follows:

inserting and retaining, for example by adhesive bonding, buzzer 13 in a housing 18 in an inner portion of a base support 17, retaining, for example, by adhesive bonding, printed circuit board 14 comprising inductive coil 14' on the inner portion of base support 17, which includes buzzer 13, retaining, for example by adhesive bonding, a ferrite magnetic shield 16 on printed circuit board 14, retaining, for example by adhesive bonding, an insulating foam layer 19 on ferrite magnetic shield 16.

The assembly method further comprises the steps of mounting the second multi-function sub-assembly 2 in the following steps:

retaining, for example by adhesive bonding, a vibrator 21 in a dedicated housing on battery enclosure structure 22, contacting contact springs to buzzer 13 and to an antenna connector in dedicated orifices in battery enclosure 22, mounting contact strips 23, 26 on battery enclosure structure 22, positioning battery 24 in battery enclosure 22.

The method may also comprise steps consisting in placing second sub-assembly 2 on centring and alignment posts 31 of base support 17, in ensuring the connection to buzzer 13, and in bending a flexible tab 15 of printed circuit board 14 having a connector 35 to ensure the connection to a watch module or to a main printed circuit board for the watch module, and in placing in contact multi-function sub-assemblies 1, 2 assembled to a watch case middle by means of a height positioning rim 32.

Once watch case 4 is mounted with all the components of the watch module and of removable case back 1, 2, the electronic or electromechanical watch can be disposed on a device for the wireless charging or recharging of watch power source 24.

It is also to be noted that with such a removable case back according to the invention for charging or recharging a power source, such as a battery, several advantages are observed compared to preceding electronic battery charging devices. As previously, any vibration or generation of sounds by a buzzer in the watch was not perceived in an adequate manner. The removable case back of the present invention makes it possible to easily integrate a standard, compact buzzer available on the market, directly on the base support, if the latter is also made of plastic material, for example. By placing such a buzzer on the base support, it is possible to improve the sensation felt by the watch wearer.

Integrating the inductive coil on a printed circuit board in the removable case back advantageously makes use of a surface complementary to that of a main printed circuit board for hardware components and saves space in height. Thus, certain hardware components can be shifted into areas beyond a critical height.

Access to all the components in the watch case, which are 95% recyclable, and in particular in the removable case back, is extremely easy, which makes it easy to replace them in the event of a problem in the assembly line. The use of glue or adhesive is also reduced to a minimum. The structure of the removable case back, which is formed of two sub-assemblies, ensures great flexibility for intermediate checks, intermediate stocks and aesthetic changes to the watch case back.

Where a battery is the power source, it is possible to provide a removable case back with a proprietary-shaped or standard cylindrical-shaped battery better suited for assembly and shock resistance. Normally, the battery used, or the rechargeable accumulator is of Li-ion technology and can be combined by the constant supply of energy, for example from a solar cell. Securing the battery in a battery enclosure of the second sub-assembly is essential to ensure good high impact resistance, which is quite different from a battery on the watch movement.

Finally, the structure of the removable case back according to the invention differs from the state of the art in that it is an assembly of very reduced thickness, made of plastic material or ceramic and waterproof to 10 bars once assembled in the watch head. It can be pre-tested independently of the watch using its card-to-card connector and with ease by mechanical connections without adhesive or screws.

From the description that has just been given, several variants of the removable case back with an electronic device for the wireless charging or recharging of a battery of the watch case can be devised by those skilled in the art without departing from the scope of the invention defined by the claims. The parts of the sub-assemblies can be assembled and retained by mechanical means other than simple adhesive bonding.

What is claimed is:

1. A removable case back of an electronic or electromechanical watch case, the case back including an internal electronic device provided with functions to allow wireless charging or recharging of a power source, the removable case back comprising:
    a first multi-function sub-assembly in which are mounted a buzzer, an inductive coil on or integrated in a printed circuit board, said inductive coil being covered by a magnetic shield on an inner side of the watch case; and
    a second multi-function sub-assembly mounted on and in direct contact with the first multi-function sub-assembly, the second multi-function sub-assembly includes an enclosure structure for accommodating the power source.

2. The case back according to claim 1, wherein the buzzer is a piezoelectric buzzer.

3. The case back according to claim 1, wherein a base support of the buzzer, of the inductive coil and of the magnetic shield of the first sub-assembly, is a component made of an injection moulded or machined material, and having a buzzer connector or a housing for accommodating the buzzer.

4. The case back according to claim 3, wherein the base support is made of ceramic or of fibre-reinforced polymer.

5. The case back according to claim 1, wherein the enclosure structure is configured to accommodate a battery or an accumulator and is made of an injection moulded material.

6. The case back according to claim 1, wherein components and connectors are mounted and connected by conductive paths on the printed circuit board with the inductive coil, and wherein the components and connectors include a pressure sensor, a compass and at least one flange connector.

7. The case back according to claim 1, wherein the magnetic shield is a ferrite part to allow passage of contact springs of the buzzer, when said buzzer is positioned and adhesive bonded in a buzzer connector or housing.

8. The case back according to claim 1, wherein the magnetic shield is covered by an insulating foam layer intended to compress a battery and ensure the resistance thereof to shocks.

9. The case back according to claim 1, wherein the second multi-function sub-assembly comprises, after assembly, a battery, at least contact strips, and a vibrator.

10. The case back according to claim 9, wherein the case back comprises two posts machined on a base support of the first multi-function sub-assembly, to position the second multi-function sub-assembly on the first multi-function sub-assembly, and to ensure the contact of the strips and of the vibrator.

11. The case back according to claim 9, wherein the second multi-function sub-assembly comprises a rim to block its position in height inside the watch case, when the second multi-function sub-assembly is clamped between the base support and a watch case middle.

12. An electronic or electromechanical watch suitable for an operation of wirelessly charging or recharging an internal power source, including a battery or an accumulator, the watch having a case formed of a front part with a crystal, a middle part and a removable case back according to claim 1,
    wherein a mechanical or electronic watch module is disposed inside the watch case above the second multi-function sub-assembly of the removable case back.

13. The electronic or electromechanical watch according to claim 12, wherein the watch is an electronic smart watch or an electromechanical wristwatch, and wherein the watch comprises a solar cell as an additional power source.

14. An assembly comprising:
    an electronic or electromechanical watch according to claim 12; and
    a device for charging or recharging the power source of the watch.

15. A method for assembling a removable case back according to claim 1, said removable case back being of an electronic or electromechanical watch case, the case back including functions to allow the wireless charging or recharging of a power source, wherein the method comprises the steps of:
    assembling the first sub-assembly in the following steps:
    inserting and adhesive bonding the buzzer in a housing in an inner portion of a base support,
    adhesive bonding the printed circuit board comprising the inductive coil on the inner portion of the base support, which comprises the buzzer,
    adhesive bonding a ferrite magnetic shield on the printed circuit board,
    adhesive bonding an insulating foam layer on the ferrite magnetic shield,
    assembling the second sub-assembly in the following steps:
    adhesive bonding a vibrator in a dedicated housing on a battery enclosure structure,
    contacting contact springs to the buzzer and an antenna connector in dedicated orifices in the battery enclosure structure,
    mounting contact strips on the battery enclosure structure,
    positioning the battery in the battery enclosure structure.

16. The method according to claim 15, further comprising the following steps:

placing the second sub-assembly on centring and alignment posts, ensuring the connection to the buzzer, and bending a flexible tab of the printed circuit board having a connector to ensure connection to a watch module or to a main printed circuit board for the watch module, placing in contact the multi-function sub-assemblies assembled to a watch case middle with a height positioning rim.

\* \* \* \* \*